(12) United States Patent
Suzuki et al.

(10) Patent No.: US 8,481,156 B2
(45) Date of Patent: Jul. 9, 2013

(54) DECORATIVE SHEET AND DECORATED FORMED PRODUCT

(75) Inventors: Yasuo Suzuki, Shizuoka (JP); Naohiro Morozumi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 863 days.

(21) Appl. No.: 12/336,639

(22) Filed: Dec. 17, 2008

(65) Prior Publication Data

US 2009/0165946 A1 Jul. 2, 2009

(30) Foreign Application Priority Data

Dec. 28, 2007 (JP) .................. 2007-341056

(51) Int. Cl.
*B32B 7/12* (2006.01)
*B32B 15/04* (2006.01)
*C09J 7/04* (2006.01)

(52) U.S. Cl.
CPC ........................ *C09J 7/048* (2013.01)
USPC ............................ 428/354; 428/343; 442/149

(58) Field of Classification Search
USPC ................... 428/343, 40.1; 442/149–151
See application file for complete search history.

(56) References Cited

U.S. PATENT DOCUMENTS

| | | | |
|---|---|---|---|
| 6,132,950 A * | 10/2000 | Ishigaki et al. | 430/619 |
| 7,371,453 B2 | 5/2008 | Suzuki et al. | |
| 2004/0241346 A1 | 12/2004 | Hanaoka et al. | |
| 2007/0238382 A1 * | 10/2007 | Funakoshi et al. | 442/151 |
| 2008/0173387 A1 | 7/2008 | Hanaoka et al. | |

FOREIGN PATENT DOCUMENTS

| | | |
|---|---|---|
| EP | 0 237 665 A1 | 9/1987 |
| JP | 52-78970 A2 | 7/1977 |
| JP | 59-35941 A | 2/1984 |
| JP | 61-132665 A | 6/1986 |
| JP | 62-73939 A | 4/1987 |
| JP | 62-282056 A | 12/1987 |
| JP | 63-137060 A | 6/1988 |
| JP | 63-178948 A | 7/1988 |
| JP | 64-077666 A | 3/1989 |
| JP | 5-16274 A | 1/1993 |

(Continued)

OTHER PUBLICATIONS

"Stabi-Line: No More Kinks." Jul. 2005, MedGadget, http://medgadget.com/archives/2005/07/stabiline_no_mo.html.*

(Continued)

*Primary Examiner* — Callie Shosho
*Assistant Examiner* — Nicholas Kokkinos
(74) *Attorney, Agent, or Firm* — Keating & Bennett, LLP

(57) ABSTRACT

A decorative sheet includes a decoration layer having air permeability and an adhesive layer on the decoration layer arranged to bond the decoration layer onto an object. The decoration layer has an adhesive permeated portion permeated with the adhesive that has diffused from the adhesive layer. The adhesive permeated portion is about one-fifth to about one-third as thick as the decoration layer. A method of making the decorative sheet includes providing the adhesive in a sheet shape, and forming an adhesive layer by applying the adhesive onto a decoration layer permeable to air. The step of forming the adhesive layer includes permeating a portion of the decoration layer with a portion of the adhesive, and making the adhesive permeate through a surface of the decoration layer to a depth corresponding to about one-fifth to about one-third of the overall thickness of the decoration layer.

7 Claims, 16 Drawing Sheets

FOREIGN PATENT DOCUMENTS

| | | |
|---|---|---|
| JP | 08-260393 A | 10/1996 |
| JP | 10-331051 A | 12/1998 |
| JP | 2000-303365 A | 10/2000 |
| JP | 2001-310378 A | 11/2001 |
| JP | 2007-30925 A | 2/2007 |
| JP | 4095972 B2 | 6/2008 |
| WO | 2004/060657 A2 | 7/2004 |

OTHER PUBLICATIONS

"2007 National Night Out Photos," Aug. 2007, Town of Munster, Indiana, http://www.munster.org/egov/docs/1186981319685.htm.*

"BASF Technical Data Sheet 2-Ethylhexyl Acrylate," Aug. 2003, BASF, http://www2.basf.us/acrylicmonomers/pdfs/2ethacr.pdf.*

Satas, D. "Handbook of Pressure Sensitive Adhesive Technology," Third Edition, Satas & Associates, Jun. 1999, pp. 288-320.*

Suzuki et al.; "Decorative Sheet, Formed Product and Vehicle"; U.S. Appl. No. 12/174,766, filed Jul. 17, 2008.

Suzuki et al.; "Decorative Sheet, Molded Article, and Motor Vehicle Provided With the Same"; U.S. Appl. No. 10/509,369, filed Sep. 28, 2004.

Suzuki et al.; "Decorative Sheet, Molded Article, and Motor Vehicle Provided With the Same"; U.S. Appl. No. 12/045,930, filed Mar. 11, 2008.

Suzuki et al.; "Decorative Sheet, Molded Article, and Motor Vehicle, and Production Method of Molded Article"; U.S Appl. No. 10/972,168, filed Oct. 22, 2004.

Suzuki et al.; "Process for Production of Moldings and Motor Vehicles"; U.S. Appl. No. 11/718,651, filed May 4, 2007.

Suzuki et al.; "Decorative Sheet, Decorated Molded Article, and Motor Vehicle"; U.S. Appl. No. 11/718,646, filed May 4, 2007.

Morozumi et al.; "Decorative Sheet, Formed Product and Transporation Apparatus"; U.S. Appl. No. 11/749,953, filed May 17, 2007.

Morozumi et al.; "Decorative Sheet, Formed Product and Transporation Apparatus"; U.S. Appl. No. 11/749,958, filed May 17, 2007.

Suzuki et al.; "Decorative Sheet, Formed Product and Vehicle"; U.S. Appl. No. 11/741,766, filed Jul. 17, 2008.

Official Communication issued in corresponding Japanese Patent Application No. 2008-318069, mailed on Jul. 3, 2012.

* cited by examiner

*PRIOR ART*

PRIOR ART

*PRIOR ART*

PRIOR ART

PRIOR ART

PRIOR ART

DECORATIVE SHEET AND DECORATED FORMED PRODUCT

BACKGROUND OF THE INVENTION

1. Field of the Invention

The present invention relates to a decorative sheet and a method of making the decorative sheet and also relates to a decorated formed product and a method of making such a product.

2. Description of the Related Art

Recently, it was disclosed that a decorative sheet could be attached to the surface of a formed product as a technique for decorating various types of formed products. A formed product with a decorative sheet can be recycled more easily than a formed product with a painted surface. In addition, a decorated product can have a different type of aesthetic appearance from that of a painted product.

FIG. 12 illustrates a typical decorative sheet. The decorative sheet 210 shown in FIG. 12 includes a base member 201 made of a resin material such as polycarbonate or polyethylene terephthalate and an ink layer 202 arranged on the principal surface 201a of the base member 201. By attaching this decorative sheet 210 to the surface of a formed product 221 in the order shown in FIGS. 13A, 13B and 13C after an adhesive layer 203 has been applied onto the ink layer 202, a formed product 220 with a decorated surface (which will be referred to herein as a "decorated formed product") can be obtained.

The formed product 221 shown in FIG. 13A includes a hemispherical (cuplike) raised portion 221a and therefore has a rugged, three-dimensional surface. For that reason, the decorative sheet 210 being attached is stretched so as to follow the rugged surface perfectly. To stretch the decorative sheet 210 to follow the rugged surface perfectly, the decorative sheet 210 is typically heated and softened before being attached.

FIG. 14 schematically illustrates a vacuum/compressed air forming system 200 for making a decorated formed product 220 such as the one shown in FIG. 13C. The vacuum/compressed air forming system 200 includes a gripping frame 230 to grip the decorative sheet 210 thereon, a supporting stage 231 for supporting a formed product thereon, heaters 233 for heating the decorative sheet 210, and a vacuum vessel 234 that houses all of these members.

The vacuum vessel 234 consists of a main vessel 234a that houses the gripping frame 230 and the supporting stage 231, and a sub-vessel 234b that houses the heaters 233. When the decorative sheet 210 is heated, the heaters 233 are introduced into the main vessel 234a.

The supporting stage 231 has a plurality of openings 231a through which the air inside the main vessel 234a can be exhausted. Although not shown in FIG. 14, a mechanism for introducing a gas from outside of this system into the main vessel 234a is also provided for the main vessel 234a.

Using this vacuum/compressed air forming system 200, a decorated formed product may be made as shown in FIGS. 15 through 17.

First, as shown in FIG. 15A, a formed product 221 is mounted on the supporting stage 231 and a decorative sheet 210 is fixed onto the gripping frame 230. As partially enlarged in FIG. 15A, an adhesive layer 203 has been applied onto the ink layer 202 of the decorative sheet 210.

Next, as shown in FIG. 15B, the decorative sheet 210 is heated with the heaters 233. In this process step, the decorative sheet 210 is preferably heated to such a temperature that enables the base member 201 to stretch easily and also enables the adhesive layer 203 to exhibit sufficiently strong adhesion.

Thereafter, as shown in FIG. 16A, the decorative sheet 210 is brought down toward the formed product 221 and then the pressure in the space 235 between the decorative sheet 210 and the formed product 221 is reduced while the pressure in the space 236 above the decorative sheet 210 is increased, thereby bonding the decorative sheet 210 onto the formed product 221 as shown in FIG. 16B.

Subsequently, as shown in FIG. 17A, an excess portion 210a of the decorative sheet 210 is trimmed with a rotating blade or any other cutter, and then the formed product 221 is removed from the supporting stage 231, thereby completing a decorated formed product 220 as shown in FIG. 17B. By performing such a vacuum/compressed air forming process, even a formed product with a rugged surface can be decorated easily and beautifully.

Recently, various sorts of synthetic leathers that feel soft and smooth and look rich and impressive have been disclosed as interior materials for cars. For example, Japanese Patent Application Laid-Open Publication No. 2000-303365 discloses suede-leather-looking, non-woven fabric with good stretchability as a type of synthetic leather.

The present inventors tentatively used this type of fabric, which is a different material from the conventional decorative sheets, in the vacuum/compressed air forming process. As a result, the present inventors discovered that in the process step of reducing and raising the pressures as shown in FIG. 16A, the air permeated through the fabric to pull and tear a portion of the fabric or make the distribution of the adhesive locally uneven, thus destroying the beauty of its appearance.

Additionally, Japanese Patent Application Laid-Open Publication No. 52-78970 discloses a technique for performing a vacuum/compressed air forming process with an impermeable sheet stacked on a permeable sheet. According to such a technique, first, a formed product 321 mounted on a vacuum forming mold 331 has its surface coated with an adhesive 303 as shown in FIG. 18A. Next, as shown in FIG. 18B, a permeable sheet 310 (e.g., a resin sheet or woven fabric with micropores) is placed on the formed product 321. Thereafter, as shown in FIG. 18C, the formed product 321 and the permeable sheet 310 are covered with an impermeable sheet 340 such as a rubber film, and the pressure in the vacuum forming mold 331 is reduced to a state to thereby obtain a decorated formed product 320 as shown in FIG. 18D.

According to the technique disclosed in Japanese Patent Application Laid-Open Publication No. 52-78970, the pressure reducing process step is carried out with the permeable sheet 310 covered with the impermeable sheet 340, and therefore, it is possible to prevent the permeation of the air through the permeable sheet 310 from destroying the beauty of the appearance.

If the adhesive 303 were applied onto the surface of the formed product 321 as disclosed in Japanese Patent Application Laid-Open Publication No. 52-78970, however, the following problems would arise. Specifically, if the formed product 321 has a rugged surface, then the permeable sheet 310 needs to be bonded onto the formed product 321 while being stretched so as to follow that ruggedness. That is why if the degree of ruggedness is significant (e.g., to the point that the permeable sheet needs to be stretched so that portions of the permeable sheet bonded to the formed product 321 will be 30-70% as thick as the original thickness of the permeable sheet), then the molten adhesive 303 will flow so as to make the thickness of the adhesive 303 uneven. With the adhesive 303 having such an uneven thickness, the adhesion will be insufficient where the adhesive 303 is too thin, thus making it difficult to have the permeable sheet 310 bonded so as to follow the rugged surface of the formed product 321 perfectly. In other words, the permeable sheet 310 will have a decreased degree of formability. On the other hand, where the adhesive 303 is too thick, the adhesive 303 will penetrate through the surface of permeable sheet 310 (i.e., the surface opposite to the formed product 321), thus ruining the decorativeness (including the smooth feel and fine appearance) of the permeable sheet 310.

Japanese Patent Application Laid-Open Publication No. 52-78970 discloses that the adhesive 303 could be applied to the permeable sheet 310 but does not disclose at all exactly how to apply the adhesive 303 or how much adhesive 303 needs to be applied. The present inventors carried out extensive research on how a decorative sheet, including a permeable decoration layer such as a non-woven fabric, should be applied to the vacuum/compressed air forming process. As a result, the present inventors discovered that even when the adhesive was simply applied to such a permeable decoration layer, the same problems as those described above also happened and the desired high degrees of formability and decorativeness could not be achieved at the same time.

SUMMARY OF THE INVENTION

In order to overcome the problems described above, preferred embodiments of the present invention provide a decorative sheet that includes a permeable decoration layer that achieves the desired high degrees of formability and decorativeness, and a decorated formed product including such a decorative sheet.

A decorative sheet according to a preferred embodiment of the present invention preferably includes a decoration layer permeable to air, and an adhesive layer arranged on the decoration layer and arranged to bond the decoration layer onto an object. The decoration layer has an adhesive permeated portion permeated with the adhesive that has diffused from the adhesive layer. The adhesive permeated portion is about one-fifth to about one-third as thick as the decoration layer.

In one preferred embodiment, the decoration layer preferably has a coefficient of extension of about 120% to about 170%, for example.

In this particular preferred embodiment, the decoration layer includes a piece of fabric having fibers.

In a specific preferred embodiment, the decoration layer has such a degree of air permeability that will produce a result of about 3 seconds through about 60 seconds when subjected to an air permeability test using a GURLEY™ densometer compliant with the ASTM-D726 standard.

A decorated formed product according to a preferred embodiment of the present invention preferably includes a formed product, and a decorative sheet according to any of the preferred embodiments of the present invention described above, bonded onto a surface of the formed product.

In one preferred embodiment, the decoration layer of the decorative sheet that has been bonded onto the surface of the formed product includes a portion that is about 30% or less as thick as the thickest portion of the decoration layer.

A transportation apparatus according to a preferred embodiment of the present invention includes a decorated formed product according to any of the preferred embodiments of the present invention described above.

A method of making a decorative sheet according to a preferred embodiment of the present invention preferably includes the steps of providing an adhesive in a sheet shape, and forming an adhesive layer by applying the adhesive onto a decoration layer with air permeability. The step of forming an adhesive layer includes the step of permeating a portion of the decoration layer with a portion of the adhesive. The step of permeating includes making the adhesive permeate through the surface of the decoration layer to a depth corresponding to about one-fifth to about one-third of the overall thickness of the decoration layer.

In one preferred embodiment, the step of permeating includes heating the adhesive and pressurizing the adhesive.

In this particular preferred embodiment, the decoration layer includes a piece of fabric having fibers.

A method of making a decorated formed product according to a preferred embodiment of the present invention preferably includes the steps of making a decorative sheet by the method of any preferred embodiment of the present invention described above, providing a formed product, and bonding the decorative sheet onto a surface of the formed product.

In one preferred embodiment, the step of bonding the decorative sheet preferably includes the steps of stacking an impermeable sheet on the decorative sheet such that the impermeable sheet is arranged opposite to the adhesive layer with respect to the decoration layer, bringing the stack of the decorative sheet and the impermeable sheet close to the formed product such that the decorative sheet faces the formed product, and reducing the pressure in a first space that is defined between the decorative sheet and the formed product to a lower level than the pressure in a second space that is defined opposite to the first space with respect to the impermeable sheet.

A method of making a decorated formed product according to a preferred embodiment of the present invention preferably includes the steps of providing a decorative sheet including a decoration layer with air permeability and an adhesive layer on the decoration layer, providing a formed product, and bonding the decorative sheet onto a surface of the formed product. The step of bonding the decorative sheet includes the step of making the adhesive of the adhesive layer permeate through the surface of the decoration layer to a depth corresponding to about one-fifth to about one-third of the overall thickness of the decoration layer.

In one preferred embodiment, the step of bonding the decorative sheet preferably includes the steps of stacking an impermeable sheet on the decorative sheet such that the impermeable sheet is arranged opposite to the adhesive layer with respect to the decoration layer, heating the stack of the decorative sheet and the impermeable sheet, bringing the stack of the decorative sheet and the impermeable sheet close to the formed product such that the adhesive layer of the decorative sheet faces the formed product, and reducing the pressure in a first space that is defined between the adhesive layer and the formed product to a lower level than the pressure in a second space that is defined opposite to the first space with respect to the impermeable sheet. The step of heating and the step of reducing the pressure may include the step of making the adhesive permeate.

The preferred embodiments of the present invention provide a decorative sheet that includes a decoration layer with air permeability and that achieves the desired high degrees of formability and decorativeness, and also provide a decorated formed product including such a decorative sheet.

Other features, elements, processes, steps, characteristics and advantages of the present invention will become more apparent from the following detailed description of preferred embodiments of the present invention with reference to the bonded drawings.

DETAILED DESCRIPTION OF PREFERRED EMBODIMENTS

Hereinafter, preferred embodiments of the present invention will be described with reference to the accompanying drawings. It should be noted that the present invention is in no way limited to the specific preferred embodiments to be described below.

Figure 1:
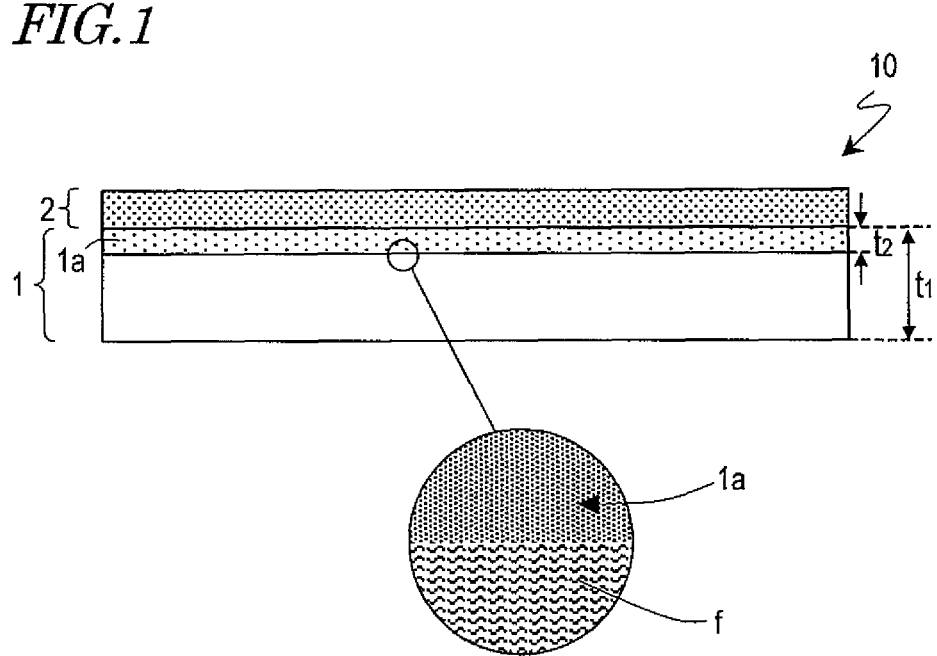
FIG. 1 illustrates a decorative sheet 10 according to a preferred embodiment of the present invention.

FIG. 1 illustrates a decorative sheet 10 as a specific preferred embodiment of the present invention. The decorative sheet 10 shown in FIG. 1 includes a decoration layer 1 and an adhesive layer 2 that is arranged on the decoration layer 1.

The decoration layer 1 has air permeability, i.e., can transmit air therethrough. Typically, the decoration layer 1 has such a degree of air permeability that will produce a result of about 3 seconds through about 60 seconds when subjected to an air permeability test using a GURLEY™ densometer compliant with the ASTM-D726 standard (such as PA-301 produced by Tester Sangyo Co., Ltd.) at a normal pressure. In this preferred embodiment, the decoration layer 1 is a piece of fabric including fibers f as partially enlarged in FIG. 1, and more specifically, a piece of non-woven fabric. There is a very large number of pores between the fibers f thus making the decoration layer 1 permeable. As will be described below, if an adhesive were applied onto such a decoration layer containing a very large number of pores by a conventional technique, then the thickness of the adhesive would often become non-uniform.

The adhesive layer 2 is provided to bond the decoration layer 1 to an object (such as a formed product). Typically, the adhesive layer 2 is a hot-melt adhesive including a thermoplastic resin or plastic as a main ingredient, for example.

As shown in FIG. 1, the decoration layer 1 includes an adhesive permeated portion 1a permeated with the adhesive that has diffused into the decoration layer 1 from the adhesive layer 2. That is, the decoration layer 1 contains the adhesive to a predetermined depth as measured from the surface of the decoration layer 1 that is in contact with the adhesive layer 2. In the decorative sheet 10 of this preferred embodiment, the ratio of the thickness $t_2$ of the adhesive permeated portion 1a to the overall thickness $t_1$ of the decoration layer 1 is defined to be within a predetermined range. Specifically, the thickness $t_2$ of the adhesive permeated portion 1a is preferably about one-fifth to about one-third as large as the overall thickness $t_1$ of the decoration layer 1. By defining the thickness $t_2$ of the adhesive permeated portion 1a within such a range, the desired high degrees of formability and decorativeness can be achieved at the same time for the following reasons.

The adhesion of the decoration layer 1 to the object depends on not only the thickness of the adhesive layer 2 but also the thickness $t_2$ of the adhesive permeated portion 1a. That is why if the thickness $t_2$ of the adhesive permeated portion 1a was less than about one-fifth of the thickness $t_1$ of the decoration layer 1, the decorative sheet 10 would have insufficient adhesion when stretched in the vacuum/compressed air forming process (and when the adhesive permeated portion 1a would be naturally thinner) to securely bond to the object. That is, the formability of the decorative sheet 10 would decrease.

Also, the pores of the decoration layer 1 contribute greatly to the decorative effects (i.e., the fine appearance and smooth feel) of the permeable decoration layer 1. That is why if the thickness $t_2$ of the adhesive permeated portion 1a was more than about one-third of the thickness $t_1$ of the decoration layer 1, then the percentage of the adhesive permeated portion 1a (i.e., a portion where the pores are closed with the adhesive) to the overall decoration layer 1 would be too high to maintain the natural appearance and feel of the decoration layer 1. As a result, the decorative effects of the decorative sheet 10 would decline significantly.

On the other hand, if the thickness $t_2$ of the adhesive permeated portion 1a is about one-fifth to about one-third as large as the thickness $t_1$ of the decoration layer 1 as in this preferred embodiment, then it is possible to prevent the formability from decreasing due to insufficient bonding or the decorativeness from declining due to the loss of the natural appearance and feel of the decoration layer 1. As a result, the desired high degrees of formability and decorativeness can be achieved at the same time. That is why even under such forming conditions that would not fulfill these two objects at the same time (e.g., even when the decorative sheet 10 is stretched by as much as about 170% in one particular direction), the forming process can still be carried out with no problems at all.

Hereinafter, a method of making the decorative sheet 10 of the present preferred embodiment will be described with reference to FIGS. 2A through 2D, which are cross-sectional views illustrating the respective process steps to make the decorative sheet 10.

Figure 2A:
FIGS. 2A through 2D are cross-sectional views illustrating the respective process steps to make the decorative sheet 10.

First, as shown in FIG. 2A, an adhesive 2a that has been formed in a sheet shape (which will be referred to herein as a "sheet adhesive") is provided. This adhesive 2a typically has a thickness of about 20 pm to about 100 μm. Such a sheet adhesive 2a can be obtained by forming the adhesive material in a thin broad plate shape by a molding process such as extrusion, a roll coater process, or a curtain coater process. As the sheet adhesive 2a, an adhesive that starts to flow at a temperature of about 80° C. to about 130° C. and that has a viscosity of about 1,000 Pa·s to about 5,000 Pa·s at 120° C. is preferably used. The flow start temperature and viscosity of the adhesive 2a can be measured with a KOKA™ flow tester. As the sheet adhesive 2a, KURANBETTER™ X4300 or KURANBETTER™ A1510 produced by Kurabo Industries Ltd. or DUS217 produced by Sheedom Co., Ltd. may be used, for example.

Figure 2B:
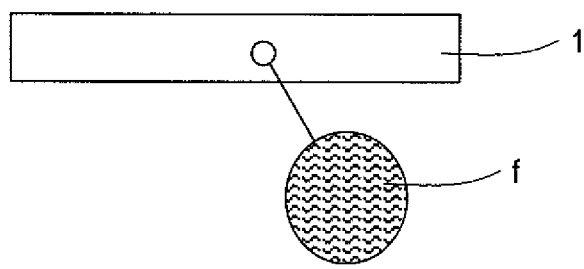

While the sheet adhesive 2a is provided, a permeable decoration layer 1 is separately provided as shown in FIG. 2B. The decoration layer 1 typically has a thickness of about 0.3 mm to about 0.5 mm (i.e., from about 300 μm to about 500 μm), for example. In this preferred embodiment, a piece of fabric including fibers f, more particularly a non-woven fabric, is used as the decoration layer 1. As the non-woven fabric, ECSAINE™ produced by Toray Industries, Inc. or GLORE™ produced by Mitsubishi Rayon Co., Ltd. may be used.

Figure 2C:
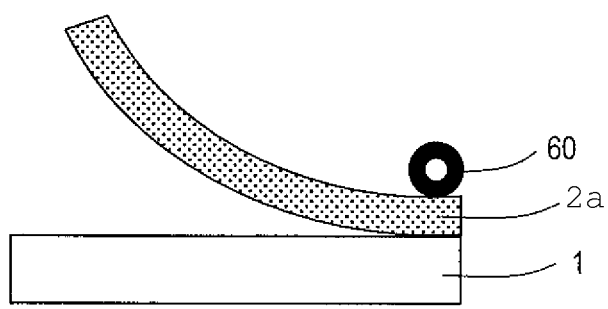
Figure 2D:
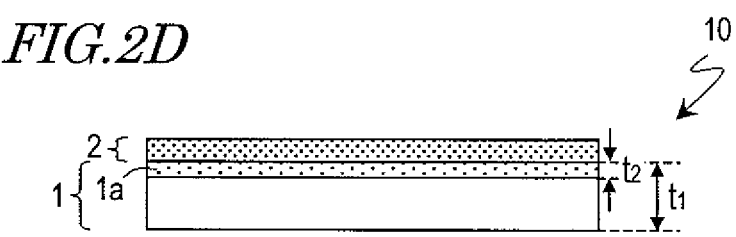

Next, as shown in FIG. 2C, the sheet adhesive 2a is applied onto the decoration layer 1 thereby forming an adhesive layer 2 as shown in FIG. 2D. In this process step of forming the adhesive layer 2 (which will be referred to herein as an "adhesive layer forming process step"), the decoration layer 1 comes to have an adhesive permeated portion 1a. That is, the adhesive layer forming process step includes the step of permeating a portion of the decoration layer 1 with the adhesive 2a (which will be referred to herein as an "adhesive permeation process step").

The adhesive permeation process step is carried out such that a portion of the sheet adhesive 2a permeates through the surface of the decoration layer 1 to a depth corresponding to about one-fifth to about one-third of the thickness of the decoration layer 1. More specifically, this adhesive permeation process step includes the steps of heating the adhesive 2a and pressurizing the adhesive 2a. That is, the adhesive permeation process step can be performed by applying the adhesive 2a onto the decoration layer 1 while heating and pressurizing it. The adhesive 2a may be heated with a heater and may be pressurized with a metallic roller 60 as shown in FIG. 2C, for example. If the adhesive mentioned above is used as the sheet adhesive 2a, the adhesive may be heated to approximately 150° C. and a pressure of about 50 g/cm$^2$ may be applied to the adhesive 2a, for example.

In this manner, a decorative sheet 10, including the adhesive permeated portion 1a as a portion of the decoration layer 1, is completed. In the manufacturing process of this preferred embodiment, the sheet adhesive 2a is used as an adhesive to be applied onto the decoration layer 1. That is why compared to using a liquid adhesive, the adhesive permeated portion 1a with a uniform thickness can be formed more easily in the permeable decoration layer 1. For that reason, the ratio of the thickness $t_2$ of the adhesive permeated portion 1a to the overall thickness $t_1$ of the decoration layer 1 can be easily adjusted such that the thickness $t_2$ of the adhesive permeated portion 1a is about one-fifth to about one-third of the thickness $t_1$ of the decoration layer 1. On the other hand, if a liquid adhesive were used, it would be difficult to permeate the decoration layer 1 having air permeability (i.e., having a large number of pores) with the adhesive to a uniform depth. In that case, it would be difficult to adjust the ratio of the thickness $t_2$ of the adhesive permeated portion 1a to the overall thickness $t_1$ of the decoration layer 1 such that the thickness $t_2$ of the adhesive permeated portion 1a is about one-fifth to about one-third of the thickness $t_1$ of the decoration layer 1.

In the preferred embodiment described above, a non-woven fabric is an example of the permeable decoration layer 1. However, the present invention is in no way limited to that specific preferred embodiment. Alternatively, any other type of general fabric may be used effectively as the decoration layer 1. Generally speaking, a fabric has permeability because it has a large number of pores between the fibers. That is why in the prior art, if a piece of fabric was used as a decorative sheet, the desired high degrees of formability and decorativeness could not be achieved at the same time. According to the preferred embodiments of the present invention, however, since the thickness $t_2$ of the adhesive permeated portion 1a is defined so as to be about one-fifth to about one-third of the thickness $t_1$ of the decoration layer 1, even such a decoration layer 1 of fabric can achieve high degrees of formability and decorativeness at the same time.

Figure 3:
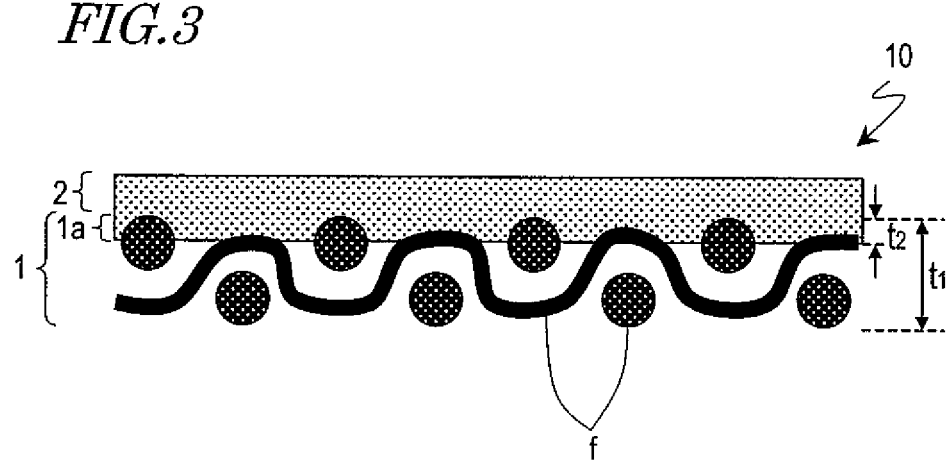
FIG. 3 is a cross-sectional view schematically illustrating an alternative decorative sheet 10.

Also, the "fabric" of the preferred embodiments of the present invention does not have to be a woven fabric or a non-woven fabric but may also be obtained by knitting nylon fibers f in a sheet shape as shown in FIG. 3 or by combining looped fiber or short fibers into a flat shape. That is, as used herein, the "fabric" generally refers to what is obtained by collecting fibers (which may be either natural fibers or synthetic fibers) into a thin broad flat shape (i.e., a sheet shape). Furthermore, the decoration layer 1 does not have to be made of a fabric as long as the decoration layer 1 has air permeability and can achieve the decoration effects of the decorative sheet 10. For example, the decoration layer 1 may be a sheet of Japanese paper including a thermoplastic binder.

Figure 11:
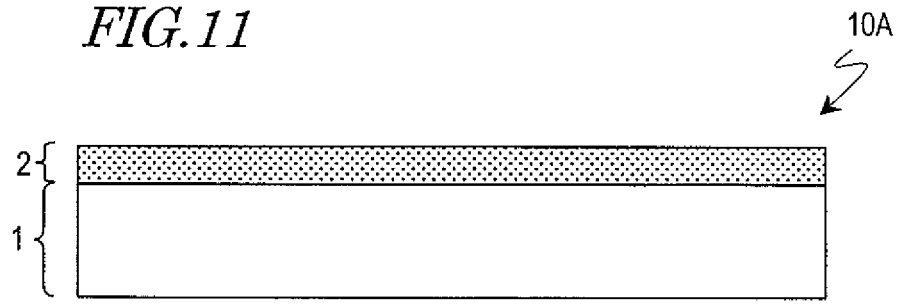
FIG. 11 is a cross-sectional view schematically illustrating a decorative sheet 10A, of which the decoration layer has no adhesive permeated portion yet.
Figure 12:
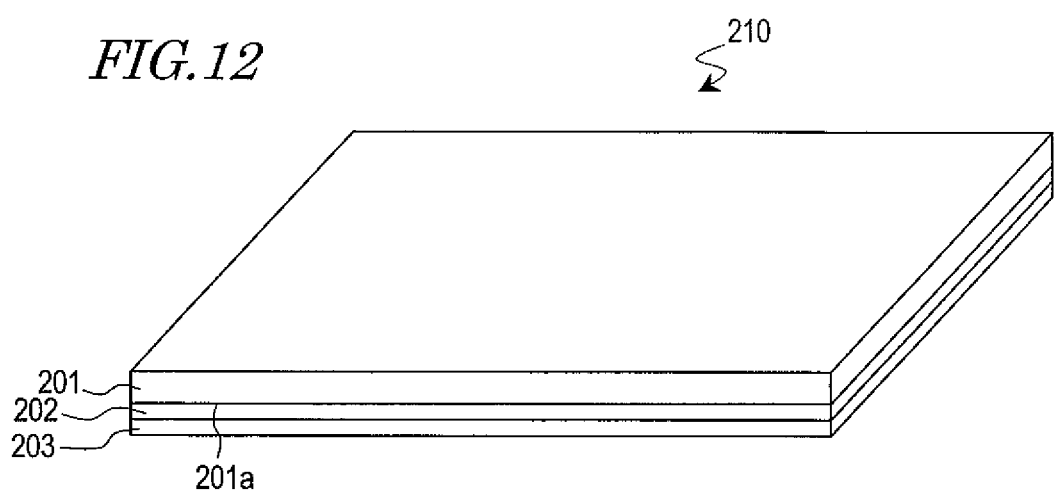
FIG. 12 is a perspective view schematically illustrating a conventional decorative sheet 210.
Figure 13A:
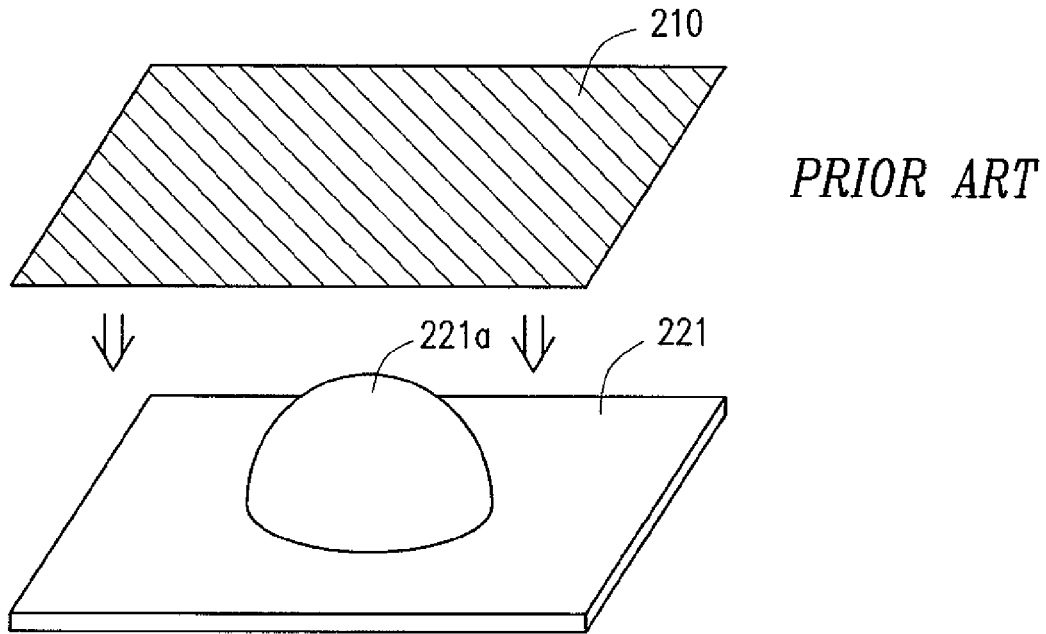
FIGS. 13A through 13C schematically illustrate respective process steps to decorate a formed product with the decorative sheet 210.
Figure 13B:
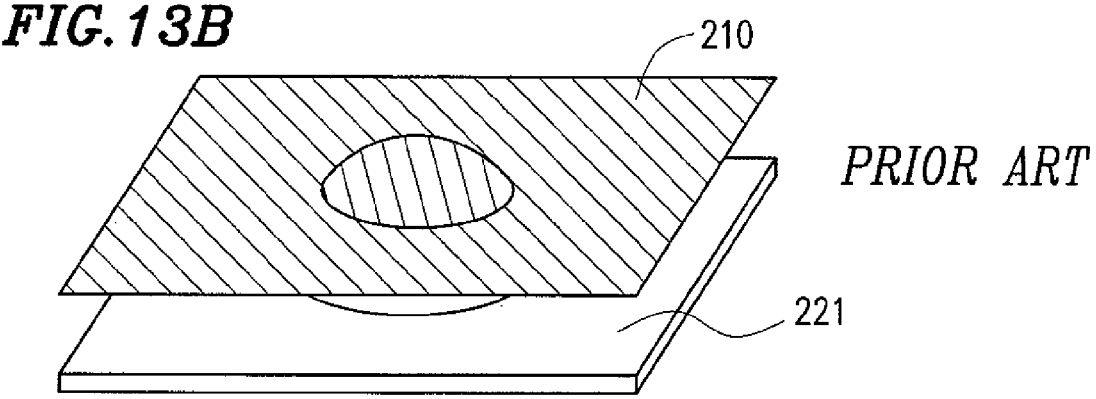
Figure 13C:
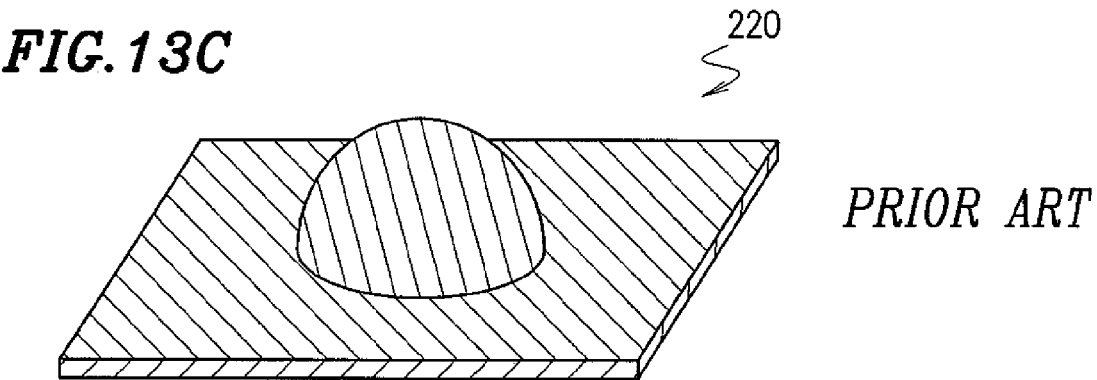
Figure 14:
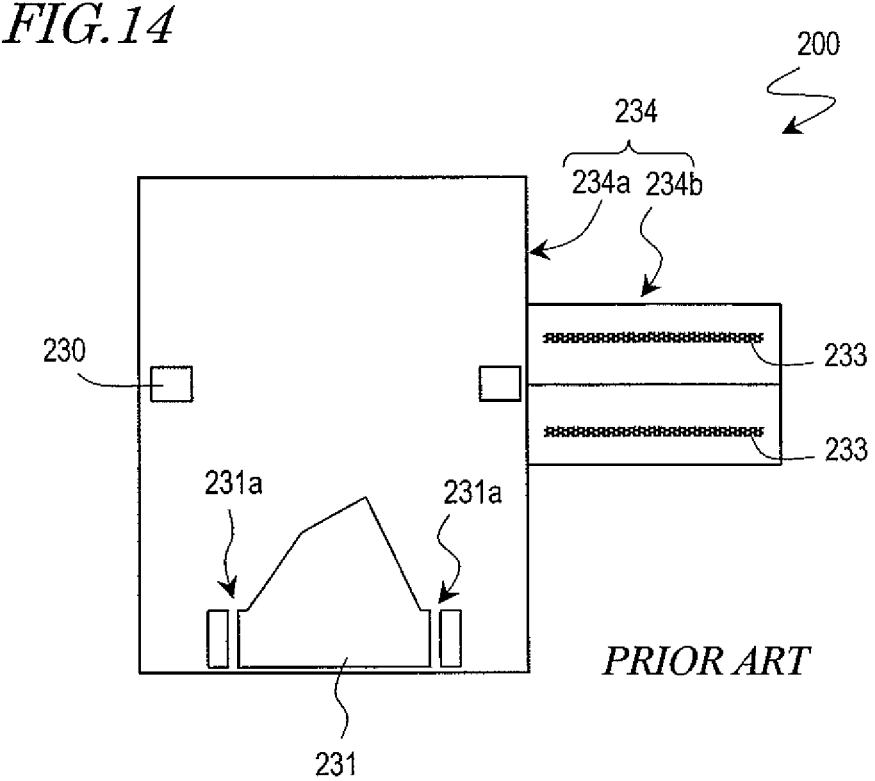
FIG. 14 schematically illustrates a vacuum/compressed air forming system 200 arranged to decorate a formed product with the decorative sheet 210.
Figure 15A:
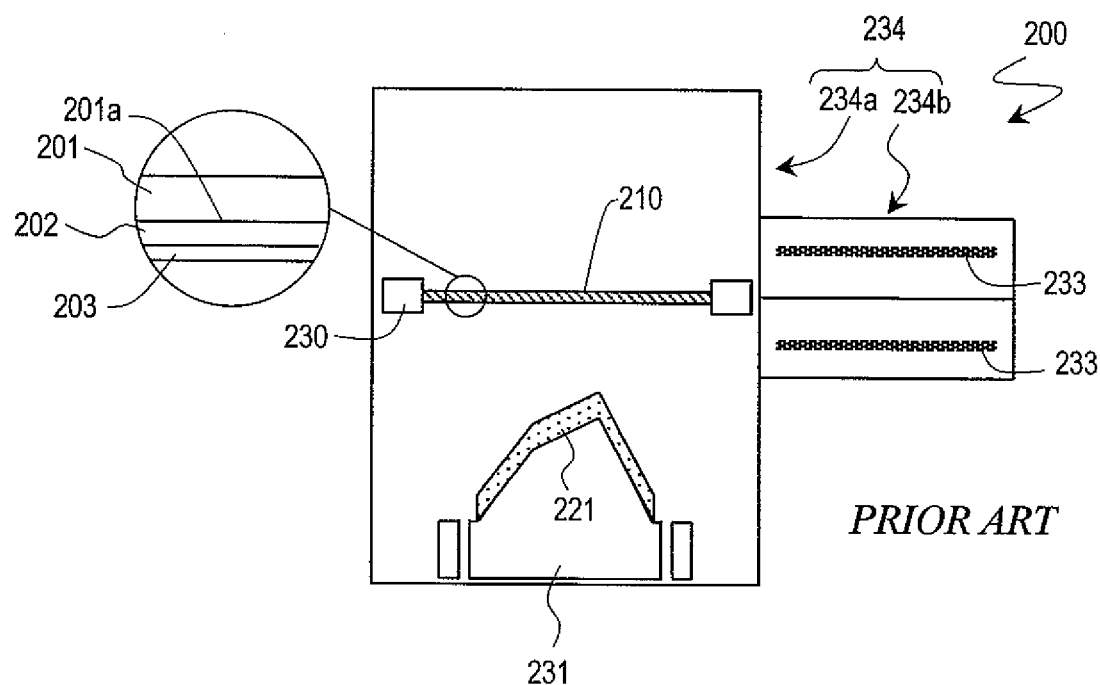
FIGS. 15A and 15B, FIGS. 16A and 16B, and FIGS. 17A and 17B are cross-sectional views schematically illustrating respective process steps to form the decorative sheet 210.
Figure 15B:
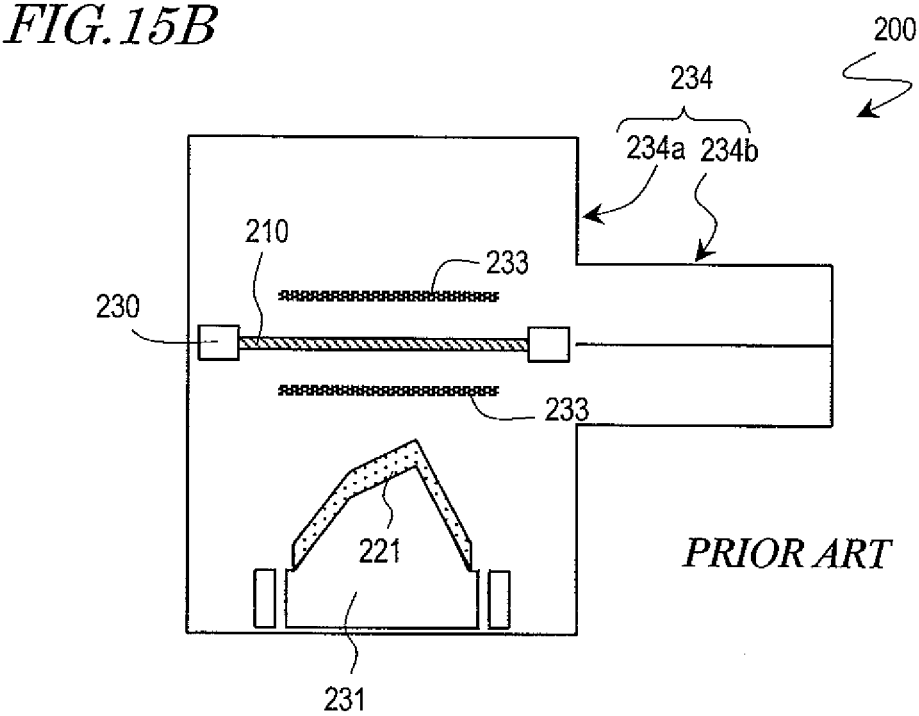
Figure 16A:
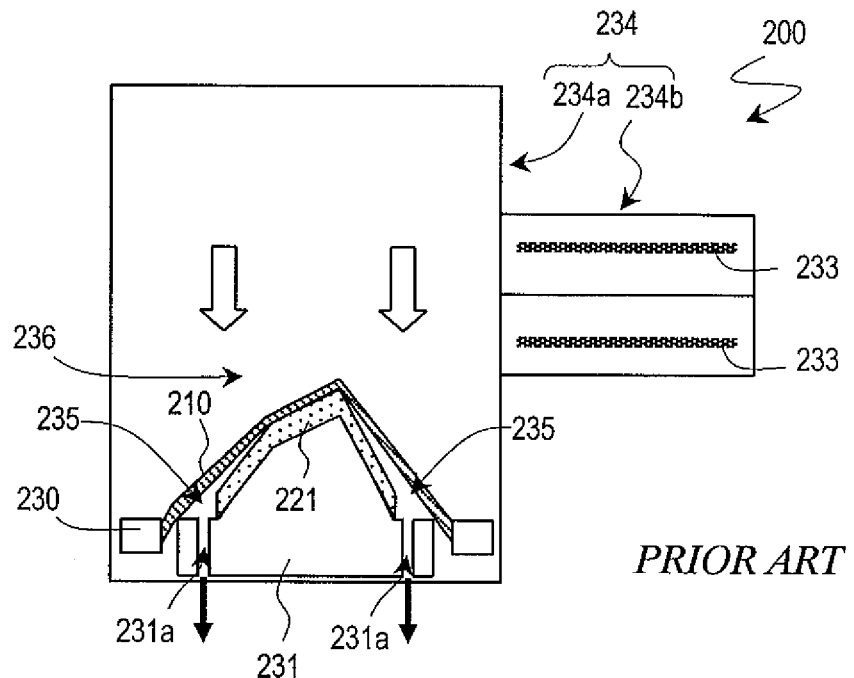
Figure 16B:
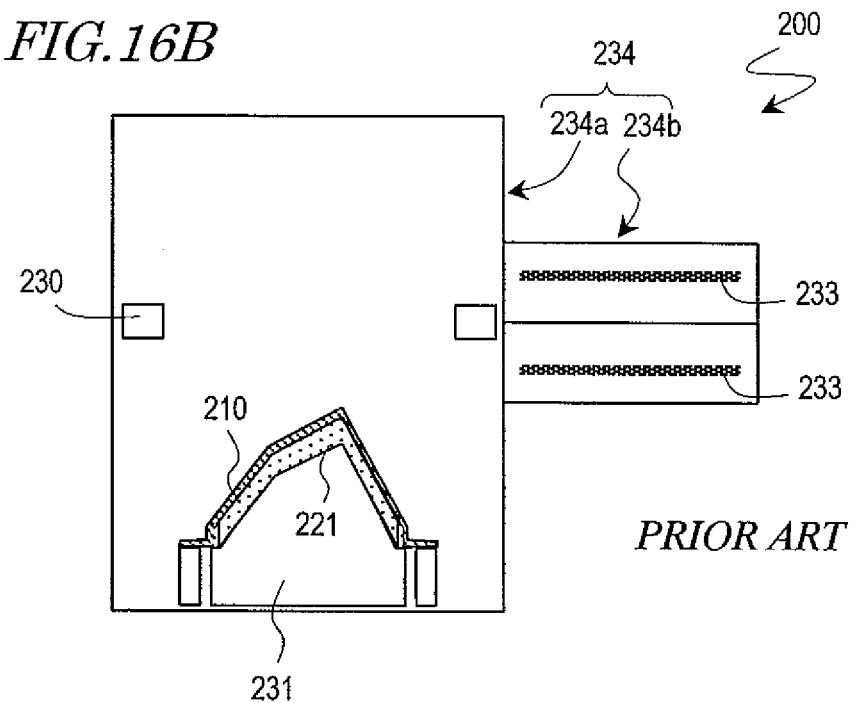
Figure 17A:
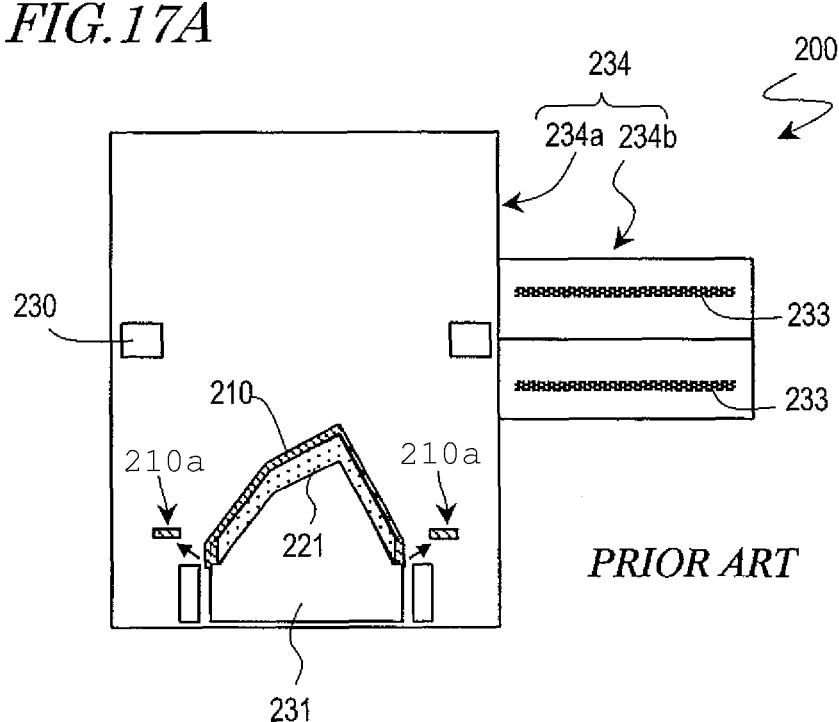
Figure 17B:
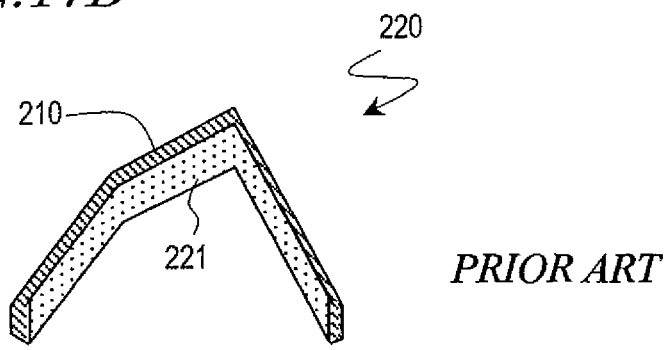
Figure 18A:
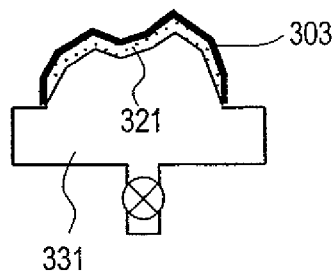
FIGS. 18A through 18D are cross-sectional views schematically illustrating the vacuum forming process steps disclosed in Japanese Patent Application Laid-Open Publication No. 52-78970.
Figure 18B:
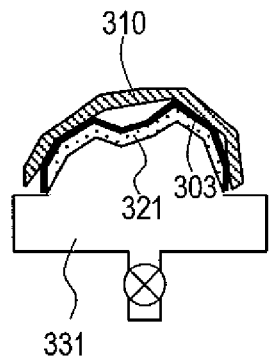
Figure 18C:
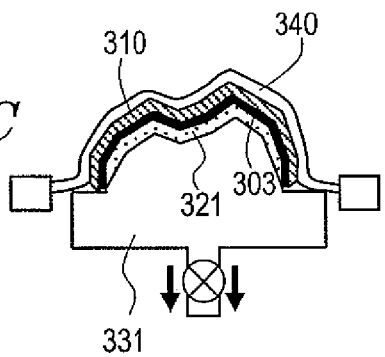
Figure 18D:
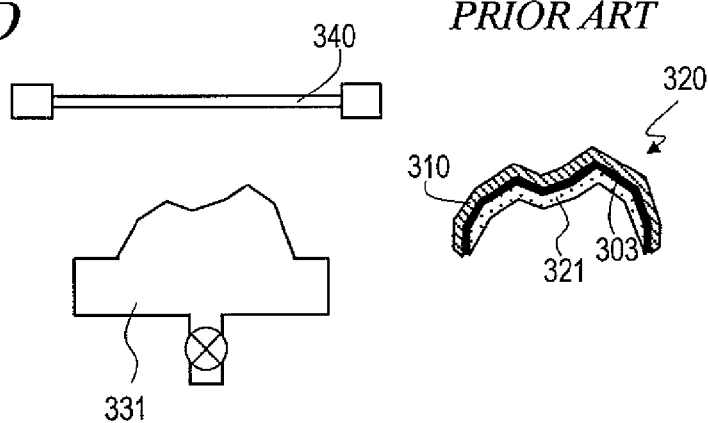

Such a permeable decoration layer 1 made of fabric often has a smaller coefficient of extension (of approximately 120-170%, for example) than the impermeable base member 201 made of a resin or plastic material as shown in FIG. 11. In other words, it can be said that the preferred embodiments of the present invention are effectively applicable to a decorative sheet 10 including a decoration layer 1 with a coefficient of extension of about 120% to about 170%. It should be noted that the coefficient of extension can be represented by $(L/L_0) \times 100$ [%], where L is the length of a sample when it breaks while being subjected to a tensile test with a predetermined load applied and $L_0$ is the original length of the sample.

Figure 4:
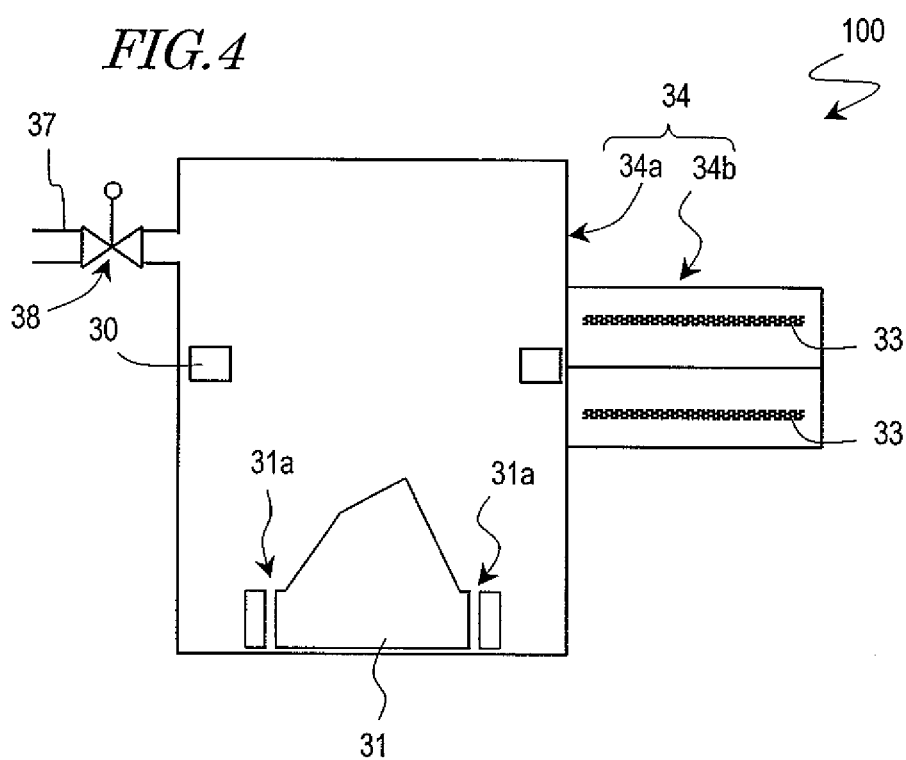
FIG. 4 schematically illustrates a vacuum/compressed air forming system 100 arranged to decorate a formed product with the decorative sheet 10.

Hereinafter, it will be described with reference to FIGS. 4 through 7 how to decorate a formed product with the decorative sheet 10 (i.e., how to make a decorated formed product). FIG. 4 schematically illustrates a vacuum/compressed air forming system 100 arranged to make a decorated formed product. FIGS. 5A through 7C are cross-sectional views schematically illustrating the respective process steps of forming the decorative sheet 10 using the vacuum/compressed air forming system 100.

The vacuum/compressed air forming system 100 shown in FIG. 4 includes a gripping frame 30 to grip the decorative sheet 10 and an assist sheet (to be described below) thereon, a supporting stage 31 arranged to support a formed product thereon, heaters (such as a far-infrared heaters) 33 arranged to heat the decorative sheet 10, and a vacuum vessel 34 that houses all of these members.

The vacuum vessel 34 includes a main vessel 34a that houses the gripping frame 30 and the supporting stage 31, and a sub-vessel 34b that houses the heaters 33. When the decorative sheet 10 is heated, the heaters 33 are introduced into the main vessel 34a.

The supporting stage 31 has a plurality of openings 31a, through which the air inside the main vessel 34a can be exhausted. A mechanism arranged to introduce a gas from outside of this system into the main vessel 34a is also provided for the main vessel 34a. For example, a pipe 37 connecting the interior of the main vessel 34a with the atmosphere is provided as shown in FIG. 4. A valve 38 is provided in the pipe 37.

Using this vacuum/compressed air forming system 100, a formed product may be decorated with the decorative sheet 10 in the following manner, for example.

Figure 5A:
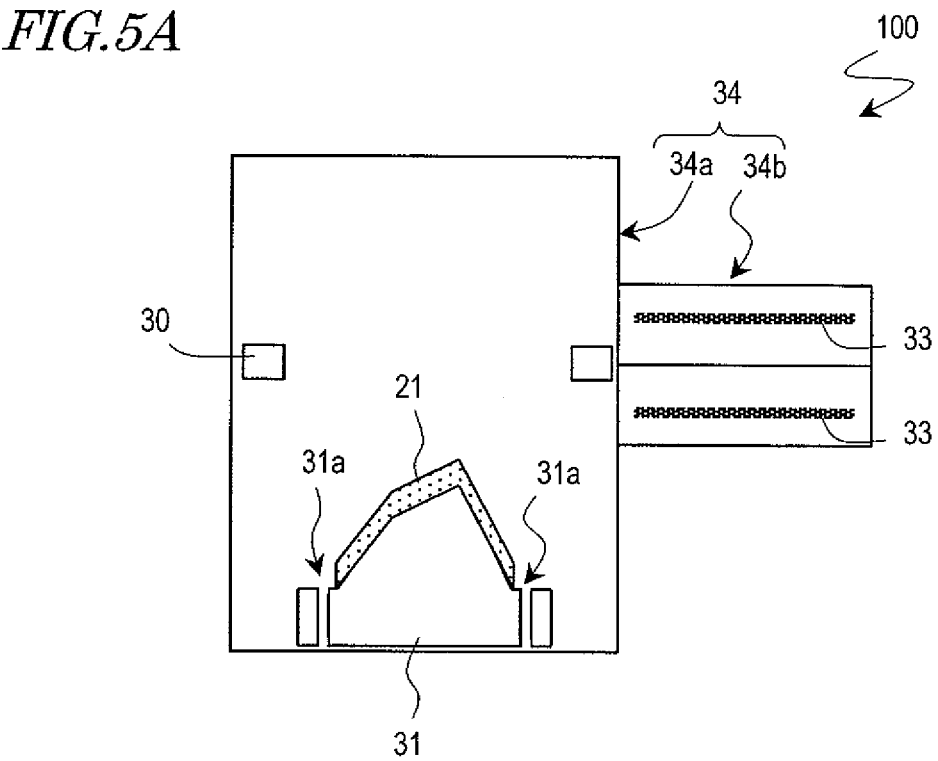
FIGS. 5A and 5B, FIGS. 6A and 6B, and FIGS. 7A through 7C are cross-sectional views schematically illustrating the respective process steps of forming the decorative sheet 10.

First, as shown in FIG. 5A, a formed product 21 is provided and mounted on the supporting stage 31. The formed product 21 may be made of a resin or plastic material, a metallic material, or any other suitable material by a known technique. For example, the formed product 21 may be made of a resin or plastic material by an injection molding process.

Figure 5B:
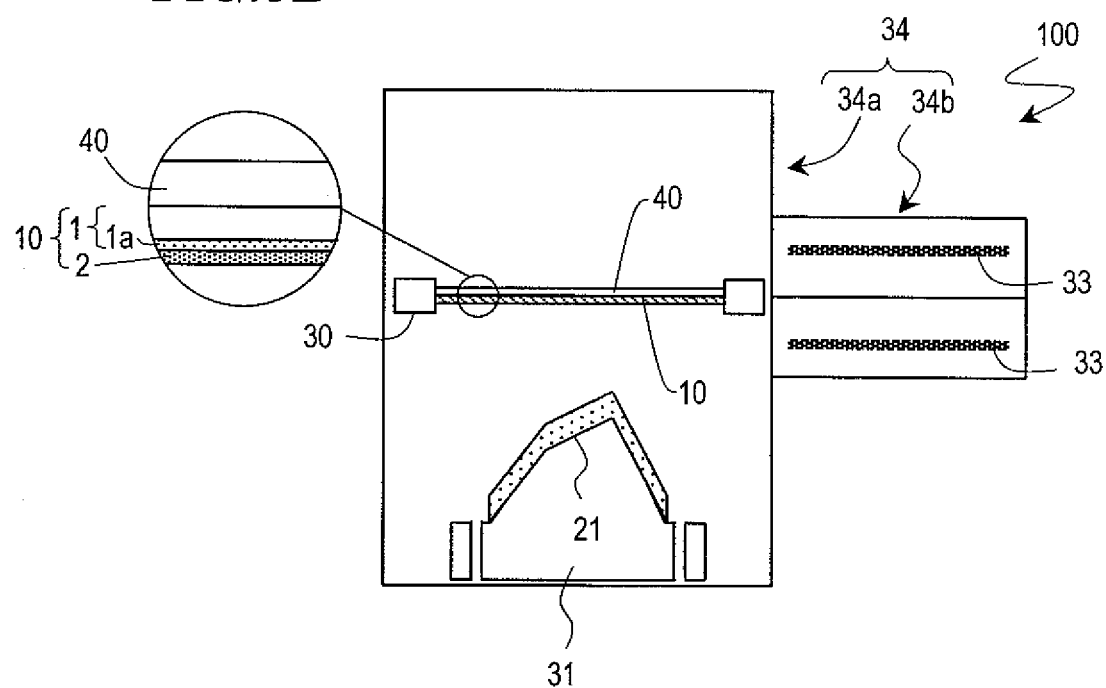

Next, the decorative sheet 10 is bonded onto the surface of the formed product 21 by performing the process steps shown in FIGS. 5B through 7B. Specifically, first, the decorative sheet 10 and an impermeable sheet 40 are provided, stacked one upon the other, and fixed onto the gripping frame 30 as shown in FIG. 5B. The decorative sheet 10 may be made by the process that has already been described with reference to FIGS. 2A through 2D. Also, the impermeable sheet 40 provided in this process step has no air permeability. The impermeable sheet 40 has such a degree of air permeability that will produce a result of more than about 60 seconds when subjected to an air permeability test using a GURLEY™ densometer compliant with the ASTM-D726 standard.

The impermeable sheet 40 is used to assist the operator in attaching the decorative sheet 10 onto the surface of the formed product 21, and therefore, will be referred to herein as an "assist sheet". As partially enlarged in FIG. 5B, the process step of stacking the assist sheet 40 on the decorative sheet 10 is carried out such that the assist sheet 40 is arranged opposite to the adhesive layer 2 with respect to the decoration layer 1. It should be noted that the assist sheet 40 has its ends just held mechanically along with the decorative sheet 10 and is not bonded to the decorative sheet 10. The assist sheet 40 is typically made of a resin or plastic material such as PP (polypropylene), FEP (tetrafluoro ethylene-hexafluoropropylene copolymer), or PTFE (polytetrafluoro ethylene), for example.

Figure 6A:
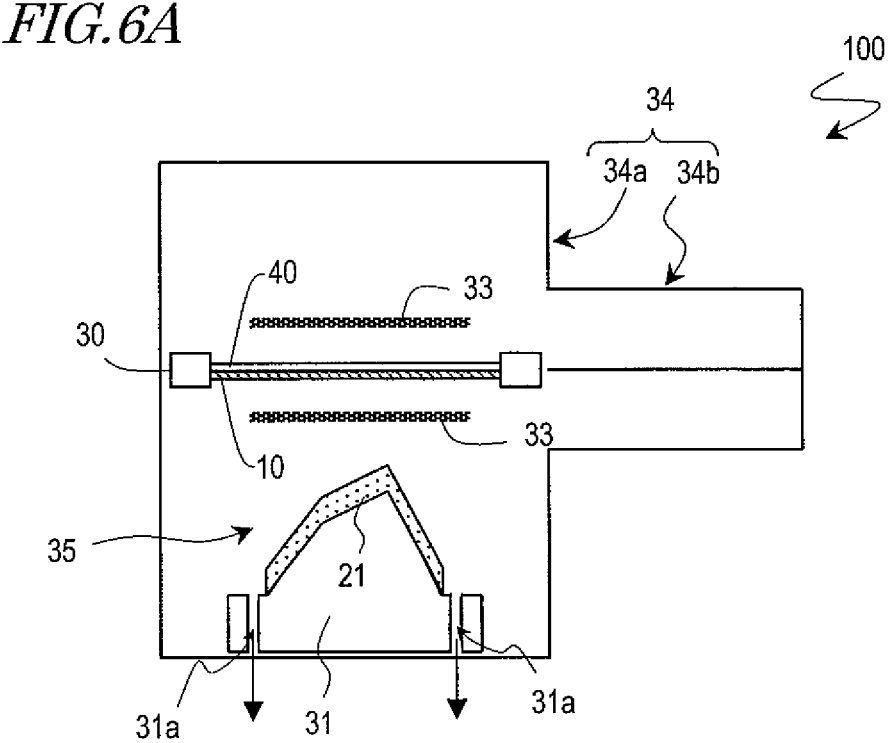

Next, as shown in FIG. 6A, the decorative sheet 10 and the assist sheet 40 are heated with the heaters 33. Meanwhile, before or after (or even in parallel with) this heating process, the space 35 between the decorative sheet 10 and the formed product 21 (i.e., between the adhesive layer 2 and the formed product 21) starts to have its pressure reduced. This space 35 (which will be referred to herein as a "first space") may have its pressure reduced by exhausting the air in the first space 35 through the openings 31a of the supporting stage 31 using a vacuum pump, for example. The heating process temperature (i.e., the temperature at which the forming process is supposed to be performed) is determined according to the material of the decoration layer 1 and the types of dye or pigment used to color the decoration layer 1. If the non-woven fabric mentioned above is used as the decoration layer 1, the forming process temperature may be approximately 170° C., for example. The decoration layer 1 is preferably sufficiently stretchable at the forming process temperature so as to follow the surface ruggedness of the formed product 21. More specifically, portions of the decoration layer 1 that should follow the surface ruggedness of the formed product 21 are preferably stretchable at least twice as much as the magnitude of the ruggedness.

Figure 8:
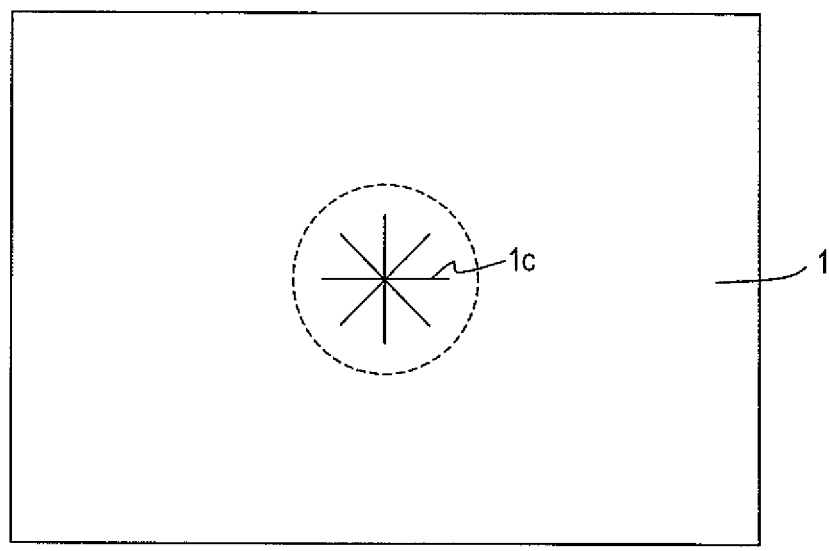
FIG. 8 is a top view illustrating another alternative decorative sheet 10.

Optionally, if the decoration layer 1 will not stretch sufficiently at the forming process temperature, then a portion of the decoration layer 1 (i.e., a portion that should follow the ruggedness of the formed product 21 as indicated by the dashed circle in FIG. 8) may have cuts 1c as shown in FIG. 8. By making such cuts 1c, the tensile stress of the decoration layer 1 during the forming process decreases so that the forming process is performed more easily. However, the cuts 1c are preferably arranged so as to be hardly noticeable in the final decorated formed product. Meanwhile, the assist sheet 40 is easily deformable along the surface ruggedness of the formed product 21 in a temperature range between the forming process temperature and the temperature that is about 50° C. lower than the forming process temperature.

Figure 6B:
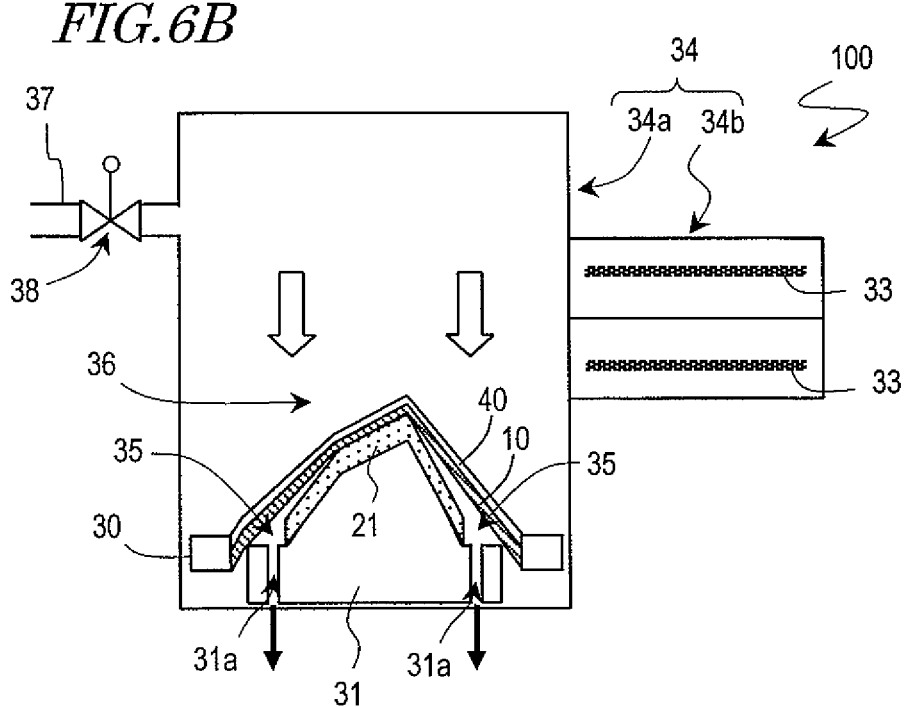
Figure 7A:
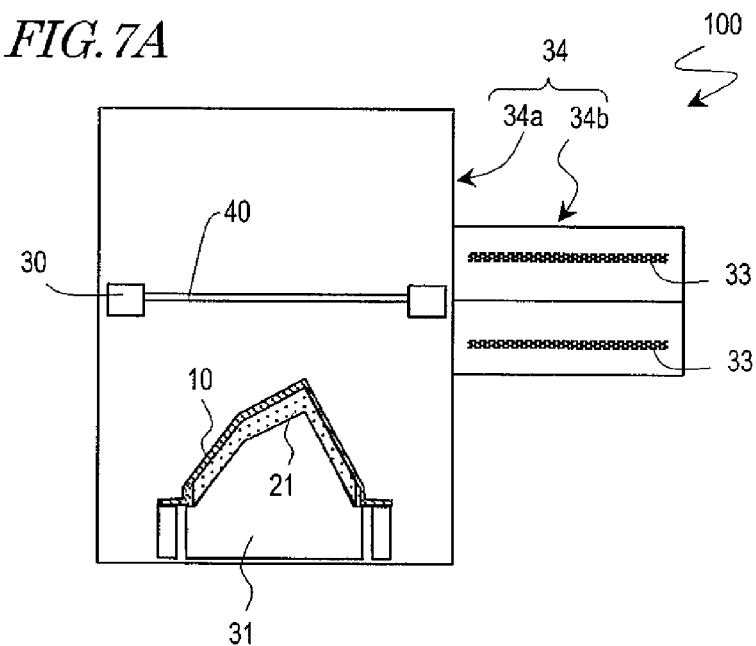

Thereafter, as shown in FIG. 6B, the stack of the decorative sheet 10 and the assist sheet 40 is brought closer to the formed product 21 such that the decorative sheet 10 (i.e., the adhesive layer 2) faces the formed product 21. At this point in time, the pressure in the first space 35 is still kept at such a low level that the decorative sheet 10, as well as the assist sheet 40, is attracted toward, and adhered closely to, the surface of the formed product 21. As a result, the decorative sheet 10 becomes bonded onto the surface of the formed product 21 as shown in FIG. 7A.

According to this preferred embodiment, in the process step shown in FIG. 6B, the space 36 above the decorative sheet 10 (which will be referred to herein as a "second space") is further pressurized, thereby making an even bigger pressure difference. As a result, the decorative sheet 10 can become bonded even more quickly. The second space 36 may be pressurized by supplying compressed air thereto with a compressor, for example. It should be noted that the second space 36 does not always have to be pressurized but the pressure in the first space 35 has only to be lower than the pressure in the second space 36.

Figure 7B:
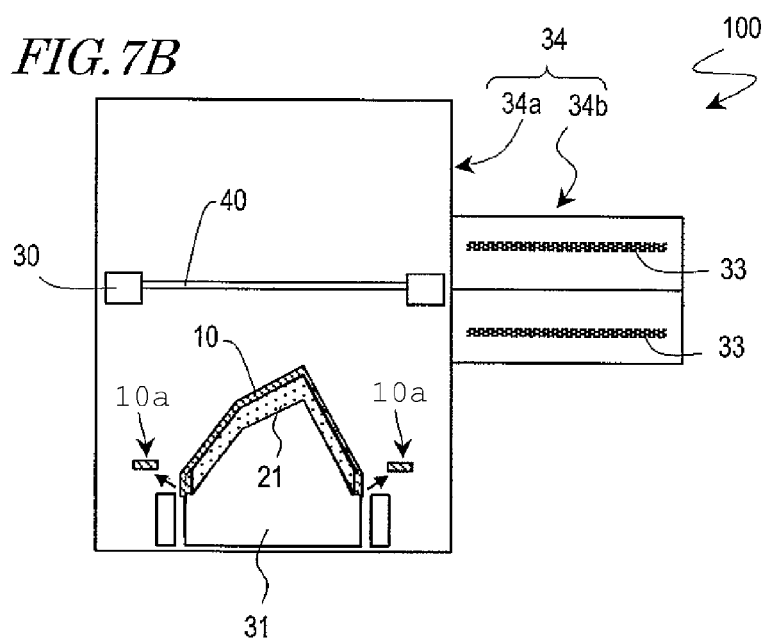
Figure 7C:
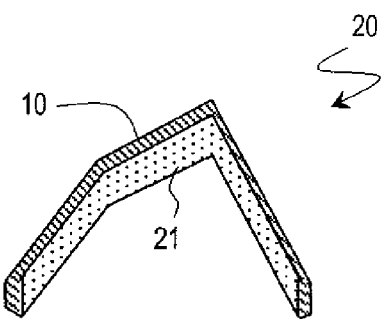

Thereafter, an excess portion 10a of the decorative sheet 10 is trimmed with a rotary blade or any other suitable cutter as shown in FIG. 7B and then the formed product 21 is removed from the supporting stage 31, thereby completing a decorated formed product 20 as shown in FIG. 7C.

In the manufacturing process of the decorated formed product 20 according to this preferred embodiment, a decorative sheet 10, of which the adhesive permeated portion 1a has a thickness $t_2$ that is about one-fifth to about one-third as large as the thickness $t_1$ of the decoration layer 1, is used thus preventing the decoration layer 1 from being bonded insufficiently and keeping the permeable decoration layer 1 from losing its natural appearance and smooth feel. Consequently, the formed product 21 can be decorated (i.e., a decorated formed product 20 can be made) without decreasing the degrees of formability and decorativeness.

On top of that, according to this preferred embodiment, the decorative sheet 10 becomes bonded after the impermeable assist sheet 40 has been stacked on the decorative sheet 10. That is why in the process step of reducing the pressure in the first space 35 to a lower level than in the second space 36, the first and second spaces 35 and 36 can be separated airtight from each other. As a result, a significant pressure difference can be made quickly between the first and second spaces 35 and 36 and the decorative sheet 10 can become bonded just as intended. It is also possible to prevent the decoration layer 1 from pulling or tearing and diminishing its fine appearance.

The decorative sheet 10 of this preferred embodiment can be used effectively to decorate a formed product 21 with a rugged surface. If the formed product 21 has a rugged surface, the decorative sheet 10 will stretch non-uniformly while being bonded and the decoration layer 1 will have varying thicknesses. According to the preferred embodiments of the present invention, however, even if the decoration layer 1 on the surface of the decorated formed product 20 has significantly varying thicknesses, the forming process can still be performed with no problems at all. Specifically, even if the decoration layer 1 of the decorative sheet 10 that has been bonded onto the surface of the formed product 21 has portions that are about 30% or less as thick as the thickest portion of the decoration layer 1, the forming process can still be performed.

Figure 9A:
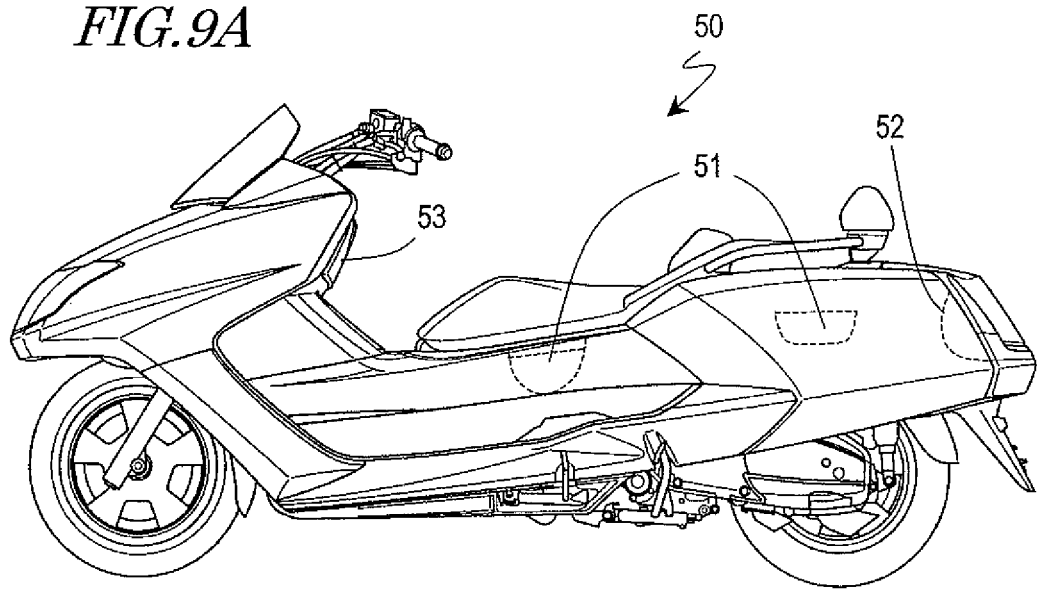
FIGS. 9A and 9B are respectively a side view and a top view schematically illustrating a motor scooter 50.
Figure 9B:
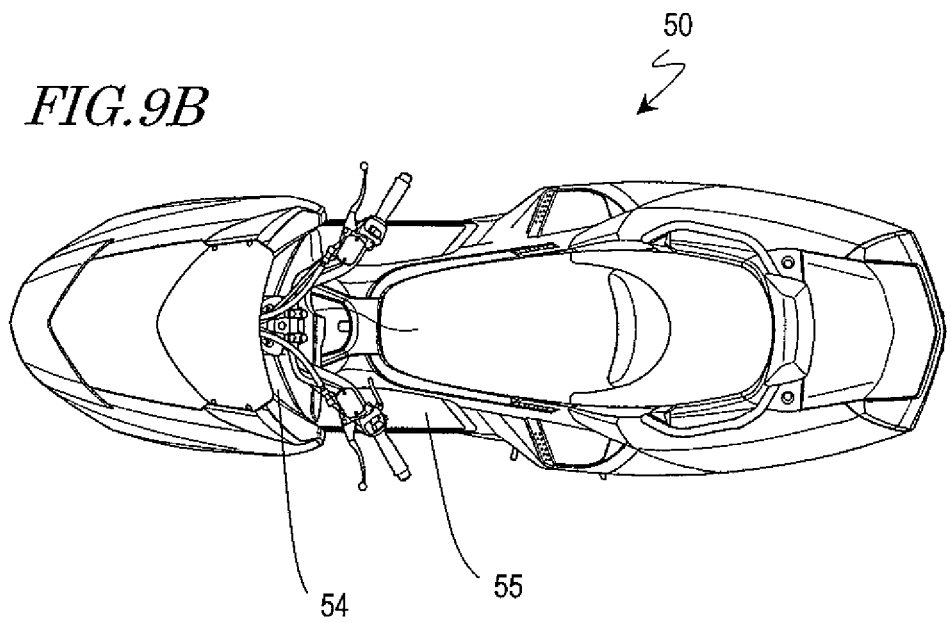
Figure 10A:
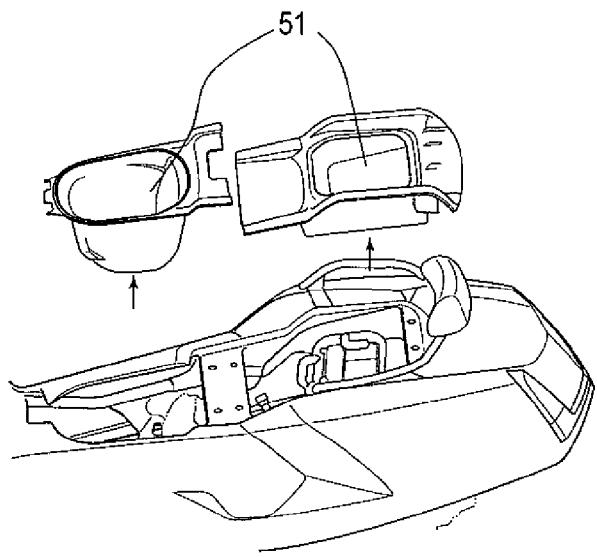
FIGS. 10A through 10C illustrate portions of the scooter 50 on a larger scale.
Figure 10B:
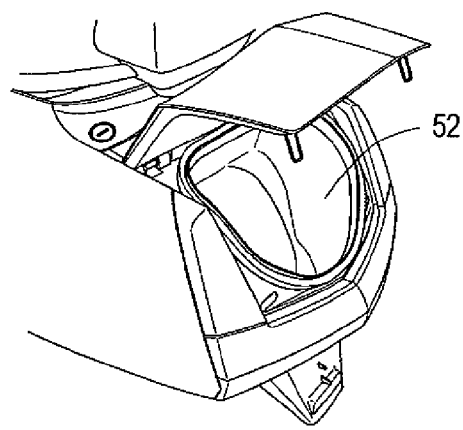
Figure 10C:
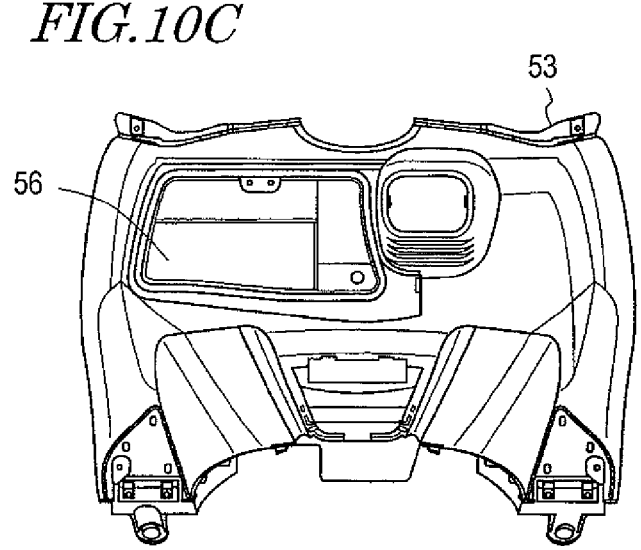

The formed product 21 decorated with the decorative sheet 10 can be used effectively as a member of the body of various types of transportation apparatuses, for example. FIGS. 9 and 10 illustrate examples of such members to be decorated with the decorative sheet 10. Specifically, FIGS. 9A and 9B are respectively a side view and a top view schematically illustrating a motor scooter 50, while FIGS. 10A through 10C illustrate portions of the scooter 50 on a larger scale.

The decorative sheet 10 of this preferred embodiment may be used to decorate the under seat boxes 51 shown in FIGS. 9A and 10A and the rear trunk box 52 shown in FIGS. 9A and 10B. Alternatively, the decorative sheet 10 may also be used to decorate the front panel 53 shown in FIGS. 9A and 10C, the meter panel 54 and footrest cover 55 shown in FIG. 9B, and the front box 56 shown in FIG. 10C.

The present inventors have actually decorated formed products 20 using the decorative sheets 10 of this preferred embodiment and rated the formability and decorativeness of the decorative sheets 10. The following Table 1 summarizes how the ratings of the formability and decorativeness changed with the ratio of the thickness $t_2$ of the adhesive permeated portion 1a to the thickness $t_1$ of the decoration layer 1. The thickness ratios were calculated both between their thinnest portions and between their thickest portions. In the column headed with "formability", ○ indicates that no bonding failures occurred, while X indicates that some bonding failures occurred. In the column headed with "decorativeness", ○ indicates that the decoration layer 1 could maintain its natural appearance and feel and X indicates that the decoration layer 1 failed to maintain its natural appearance and feel. And in the column headed with "total rating", ○ indicates that both the formability and decorativeness were good enough and X indicates that at least one of the formability and decorativeness was not so good.

As can be seen from the results of Comparative Examples #1 through #14 shown in Table 1, if the thickness $t_2$ of the adhesive permeated portion 1a is less than about one-fifth, or more than about one-third, of the thickness $t_1$ of the decoration layer 1 over the entire decorative sheet 10, at least one of formability and decorativeness declined. On the other hand, as can be seen from the results of Specific Examples #1 to #3 of preferred embodiments of the present invention, if the thickness $t_2$ of the adhesive permeated portion 1a was about one-fifth to about one-third of the thickness $t_1$ of the decoration layer 1 over the entire decorative sheet 10, neither formability nor decorativeness declined but desired high degrees of formability and decorativeness were achieved.

Table 1 also shows how to form the adhesive layer 2 in each of Comparative Examples #1 through #14 and Specific Examples #1 through #3 of preferred embodiments of the present invention. Comparing the results of Comparative Examples #1 through #6 to those of Comparative Examples #7 through #14 and Specific Examples #1 through #3, it can be seen that when the sheet adhesive 2a was used, the thickness $t_2$ of the adhesive permeated portion 1a tended to vary less significantly than a situation where a liquid adhesive was used. In order to make the thickness $t_2$ of the adhesive permeated portion 1a uniform, the sheet adhesive 2a is preferably used. Also, comparing the results of Comparative Examples #7 through #12 to those of Comparative Examples #13 and #14 and Specific Examples #1 through #3, it can be seen that if the sheet adhesive 2a was allowed to permeate through the decoration layer 1 by heating and pressurizing it at the same, the thickness $t_2$ of the adhesive permeated portion 1a tended to vary even less significantly compared to a situation where the sheet adhesive 2a was just heated without being pressurized. For that reason, to make the thickness $t_2$ of the adhesive permeated portion 1a even more uniform, the sheet adhesive 2a is preferably allowed to permeate through the decoration layer 1 by heating and pressurizing it at the same time.

Alternative Preferred Embodiments

In the manufacturing process of a decorated formed product 20 described above, a decorative sheet 10, of which the decoration layer 1 preferably already includes an adhesive permeated portion 1a, is provided and then is bonded onto the surface of the formed product 21. Alternatively, a decorative sheet 10A as shown in FIG. 11, of which the decoration layer 1 has no adhesive permeated portion yet, may be provided and then the decoration layer 1 may be permeated with the adhesive that has diffused from the adhesive layer 2 while the decorative sheet 10A is being bonded.

The decorative sheet 10A shown in FIG. 11 preferably includes a permeable decoration layer 1 and an adhesive layer 2 arranged on the decoration layer 1. However, unlike the decorative sheet 10 shown in FIG. 1, the adhesive in the

TABLE 1

|  | Adhesive layer is formed by | (t2/t1) ratio | | Formability | Decorativeness | Total rating |
| --- | --- | --- | --- | --- | --- | --- |
|  |  | Min. | Max. |  |  |  |
| Cmp. Ex. 1 | Applying liquid adhesive | 1/5 (20%) | 3/4 (75%) | ○ | X | X |
| Cmp. Ex. 2 |  | 1/3 (33%) | 4/5 (80%) | ○ | X | X |
| Cmp. Ex. 3 |  | 1/8 (13%) | 1/7 (14%) | X | ○ | X |
| Cmp. Ex. 4 |  | 1/7 (14%) | 1/4 (25%) | X | ○ | X |
| Cmp. Ex. 5 |  | 1/3 (33%) | 4/5 (80%) | ○ | X | X |
| Cmp. Ex. 6 |  | 3/4 (75%) | 4/5 (80%) | ○ | X | X |
| Cmp. Ex. 7 | Using sheet adhesive and making it permeate with only heat | 3/4 (75%) | 4/5 (80%) | ○ | X | X |
| Cmp. Ex. 8 |  | 4/5 (80%) | 5/6 (83%) | ○ | X | X |
| Cmp. Ex. 9 |  | 1/6 (17%) | 1/5 (20%) | X | ○ | X |
| Cmp. Ex. 10 |  | 1/8 (13%) | 1/7 (14%) | X | ○ | X |
| Cmp. Ex. 11 |  | 6/7 (86%) | 7/8 (88%) | ○ | X | X |
| Cmp. Ex. 12 |  | 1/7 (14%) | 6/7 (86%) | X | X | X |
| Cmp. Ex. 13 | Using sheet adhesive and making it permeate with heat and pressure | 6/7 (86%) | 7/8 (88%) | ○ | X | X |
| Cmp. Ex. 14 |  | 1/6 (17%) | 1/4 (25%) | X | ○ | X |
| Spc. Ex. 1 |  | 1/4 (25%) | 1/3 (33%) | ○ | ○ | ○ |
| Spc. Ex. 2 |  | 1/5 (20%) | 1/3 (33%) | ○ | ○ | ○ |
| Spc. Ex. 3 |  | 1/5 (20%) | 1/4 (25%) | ○ | ○ | ○ | adhesive layer 2 has not reached the inside of the decoration layer 1 yet. In other words, the decoration layer 1 still has no adhesive permeated portion yet. This decorative sheet 10A can be obtained by just stacking the sheet adhesive 2a shown in FIG. 2 on the decoration layer 1 without heating or pressurizing it.

By using such a decorative sheet 10A, a decorated formed product 20 can be made almost in the same way as the process previously described with reference to FIGS. 4 through 7C. If this decorative sheet 10A is used, however, the heating process step and the pressure reducing process step (i.e., the process steps shown in FIGS. 6A and 6B) involve the adhesive permeation process step that is carried out to make the adhesive permeate through the surface of the decoration layer 1 to a depth corresponding to about one-fifth to about one-third of the thickness of the decoration layer 1. For example, if the adhesive mentioned above is used as the sheet adhesive 2a, the forming process conditions need to be adjusted such that the heating process temperature becomes approximately 150° C. and the pressure applied to the decorative sheet 10A becomes approximately 50 g/cm$^2$.

Even if the process step of bonding the decorative sheet 10A involves the adhesive permeation process step in this manner, it is also possible to prevent bonding failures from occurring and maintain the natural appearance and feel of the decoration layer 1 with air permeability. Consequently, the formed product 21 can be decorated (i.e., a decorated formed product 20 can be made) without decreasing the degrees of formability and decorativeness.

In this example, the decoration layer 1 of the decorative sheet 10A is supposed to have no adhesive permeated portion at all. Alternatively, a decorative sheet, of which the adhesive permeated portion is less than about one-fifth as thick as the decoration layer, may also be used. The same effects can also be achieved even by using such a decorative sheet and allowing the adhesive to permeate such that the adhesive permeated portion becomes about one-fifth to about one-third as thick as the decoration layer in the process step of bonding the decorative sheet.

The preferred embodiments of the present invention provide a decorative sheet that include a decoration layer with air permeability and that achieve the desired high degrees of formability and decorativeness, and also provide a decorated formed product including such a decorative sheet.

The decorative sheet of the preferred embodiments of the present invention have such high degrees of formability and decorativeness as to be used effectively as an interior member for various types of transportation apparatuses including passenger cars, buses, trucks, motorcycles, tractors, airplanes, motorboats, and civil engineering vehicles, for example.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2007-341056 filed on Dec. 28, 2007, the entire contents of which are hereby incorporated by reference.

What is claimed is:

1. A decorative sheet comprising:
a decoration layer permeable to air; and
an adhesive layer on the decoration layer and arranged to bond the decoration layer onto an object; wherein
the decoration layer has an adhesive permeated portion permeated with the adhesive diffused from the adhesive layer;
the adhesive permeated portion is about one-fifth to about one-third as thick as the decoration layer; and
the adhesive in the adhesive layer is the same adhesive as the adhesive in the adhesive permeated portion.

2. The decorative sheet of claim 1, wherein the decoration layer has a coefficient of extension of about 120% to about 170%.

3. The decorative sheet of claim 1, wherein the decoration layer includes a fabric having fibers.

4. The decorative sheet of claim 1, wherein the decoration layer has a degree of air permeability that will produce a result of about 3 seconds through about 60 seconds when subjected to an air permeability test using a Gurley densometer compliant with the ASTM-D726 standard.

5. A decorated formed product comprising:
a formed product; and
the decorative sheet of claim 1 bonded onto a surface of the formed product.

6. The decorated formed product of claim 5, wherein the decoration layer of the decorative sheet bonded onto the surface of the formed product includes a portion that is about 30% or less as thick as the thickest portion of the decoration layer.

7. A transportation apparatus comprising:
the decorated formed product of claim 5.

* * * * *